US012578581B2

(12) United States Patent
Strongwater et al.

(10) Patent No.: US 12,578,581 B2
(45) Date of Patent: Mar. 17, 2026

(54) HEAD-MOUNTED DISPLAY WITH FACIAL INTERFACE FOR SENSING PHYSIOLOGICAL CONDITIONS

(71) Applicant: APPLE INC., Cupertino, CA (US)

(72) Inventors: Daniel M. Strongwater, San Francisco, CA (US); Kristi E. Bauerly, Los Altos, CA (US); Dustin A. Hatfield, Los Gatos, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 18/219,208

(22) Filed: Jul. 7, 2023

(65) Prior Publication Data

US 2023/0350214 A1 Nov. 2, 2023

Related U.S. Application Data

(63) Continuation of application No. 16/742,064, filed on Jan. 14, 2020, now Pat. No. 11,740,475.

(Continued)

(51) Int. Cl.
*G02B 27/01* (2006.01)
*G06F 3/01* (2006.01)
(Continued)

(52) U.S. Cl.
CPC ......... *G02B 27/0176* (2013.01); *G06F 3/012* (2013.01); *G06F 3/015* (2013.01);
(Continued)

(58) Field of Classification Search
CPC ........ G02B 27/0176; G02B 2027/0138; G06V 40/176; G06V 10/176; G06F 3/012; G06F 3/015
See application file for complete search history.

(56) References Cited

U.S. PATENT DOCUMENTS 5,486,841 A * 1/1996 Hara .................... H04N 13/398
345/9
5,822,127 A 10/1998 Chen et al.
(Continued)

FOREIGN PATENT DOCUMENTS

CN 105388615 A 3/2016
CN 105455792 A 4/2016
(Continued)

OTHER PUBLICATIONS

Ifixit.com, "HTC Vive Teardown", Published Apr. 26, 2016, Downloaded Jul. 15, 2017, https://www.ifixit.com/Teardown/HTC+Vive+Teardown/62213#s130812, 22 pp.
(Continued)

*Primary Examiner* — Ariel A Balaoing
(74) *Attorney, Agent, or Firm* — Young, Basile Handlon & MacFarlane, P.C.

(57) ABSTRACT

A head-mounted display includes a display unit and a facial interface. The display unit displays graphical content to the user. The facial interface is removably coupleable to the display unit and engages a facial engagement region of a face of the user whereby the display unit is supported on the face of the user. The facial interface includes a physiological sensor for sensing a physiological condition of the user in the facial engagement region.

22 Claims, 11 Drawing Sheets

Related U.S. Application Data

(60) Provisional application No. 62/793,466, filed on Jan. 17, 2019.

(51) Int. Cl.
_G06T 19/00_ (2011.01)
_G06V 40/16_ (2022.01)

(52) U.S. Cl.
CPC .... _G06V 40/176_ (2022.01); _G02B 2027/0138_ (2013.01); _G06T 19/006_ (2013.01)

(56) References Cited

U.S. PATENT DOCUMENTS

| | | | |
|---|---|---|---|
| 5,844,530 | A | 12/1998 | Tosaki |
| 5,954,642 | A | 9/1999 | Johnson et al. |
| 6,421,031 | B1 | 7/2002 | Ronzani et al. |
| 6,520,182 | B1 | 2/2003 | Gunaratnam |
| 6,596,161 | B2 | 7/2003 | Kerfoot |
| 7,216,647 | B2 | 5/2007 | Lang et al. |
| 8,482,488 | B2 | 7/2013 | Jannard |
| 8,576,276 | B2 | 11/2013 | Bar-Zeev et al. |
| 8,605,008 | B1 | 12/2013 | Prest et al. |
| 8,661,662 | B1 | 3/2014 | Cok |
| 8,814,691 | B2 | 8/2014 | Haddick et al. |
| 9,274,340 | B2 | 3/2016 | Lyons |
| 9,836,663 | B2 | 12/2017 | Yun et al. |
| 9,851,267 | B1 | 12/2017 | Ma et al. |
| 10,045,449 | B1 * | 8/2018 | Yee ..................... G02B 27/017 |
| 10,564,717 | B1 * | 2/2020 | Shahmohammadi ... G06F 3/015 |
| 11,163,166 | B1 * | 11/2021 | Ebert ................. G02B 27/0176 |
| 11,768,538 | B1 * | 9/2023 | Wang ................. G02B 27/0176 |
| | | | 345/156 |
| 11,857,378 | B1 * | 1/2024 | Bojarski ............ G02B 27/0176 |
| 11,982,816 | B1 * | 5/2024 | Hossain ............. G02B 27/0176 |
| 2004/0097839 | A1 | 5/2004 | Epley |
| 2004/0183749 | A1 | 9/2004 | Vertegaal |
| 2012/0075169 | A1 | 3/2012 | Iba et al. |
| 2012/0316661 | A1 * | 12/2012 | Rahman ................ G06F 1/1694 |
| | | | 700/94 |
| 2013/0222235 | A1 | 8/2013 | Abdollahi et al. |
| 2013/0322683 | A1 * | 12/2013 | Jacobs ............... G02B 27/0149 |
| | | | 382/103 |
| 2014/0126782 | A1 | 5/2014 | Takai et al. |
| 2014/0159995 | A1 | 6/2014 | Adams et al. |
| 2014/0292653 | A1 | 10/2014 | Kamba et al. |
| 2014/0375540 | A1 * | 12/2014 | Ackerman ................ G06F 3/16 |
| | | | 345/156 |
| 2015/0035744 | A1 * | 2/2015 | Robbins ............... G02B 27/017 |
| | | | 345/156 |
| 2015/0148774 | A1 | 5/2015 | Yao |
| 2015/0219901 | A1 | 8/2015 | Morimoto |
| 2015/0261291 | A1 * | 9/2015 | Mikhailov ................ G06T 7/73 |
| | | | 345/156 |
| 2015/0295923 | A1 | 10/2015 | Porwal |
| 2016/0036151 | A1 | 2/2016 | Tominaga et al. |
| 2016/0062454 | A1 * | 3/2016 | Wang ................. G02B 27/0172 |
| | | | 345/633 |
| 2016/0065952 | A1 * | 3/2016 | Han ........................ G06V 40/19 |
| | | | 345/8 |
| 2016/0077547 | A1 * | 3/2016 | Aimone ............... A61B 5/6814 |
| | | | 345/8 |
| 2016/0133170 | A1 | 5/2016 | Fateh |
| 2016/0216760 | A1 | 7/2016 | Trutna et al. |
| 2016/0224176 | A1 | 8/2016 | Kim et al. |
| 2016/0353093 | A1 | 12/2016 | Lyon et al. |
| 2017/0095157 | A1 * | 4/2017 | Tzvieli .................. A61B 5/6803 |
| 2017/0261388 | A1 | 9/2017 | Ma et al. |
| 2017/0277254 | A1 | 9/2017 | Osman |
| 2017/0365101 | A1 | 12/2017 | Samec et al. |
| 2018/0046147 | A1 | 2/2018 | Aghara et al. |
| 2018/0054553 | A1 | 2/2018 | Choi et al. |
| 2018/0092588 | A1 * | 4/2018 | Tzvieli .................. G01J 5/0025 |
| 2018/0092706 | A1 | 4/2018 | Anderson et al. |
| 2018/0348863 | A1 | 12/2018 | Aimone et al. |
| 2018/0364491 | A1 * | 12/2018 | Park .................... G02B 27/0176 |
| 2019/0250651 | A1 * | 8/2019 | Liu ..................... G05D 16/2066 |
| 2019/0324280 | A1 * | 10/2019 | Yildiz ............... G02B 27/0176 |
| 2019/0349576 | A1 * | 11/2019 | Yildiz ............... G02B 27/0093 |
| 2020/0026079 | A1 * | 1/2020 | Franklin ........... G02B 27/0149 |
| 2020/0356136 | A1 | 11/2020 | Aimone et al. |
| 2022/0148728 | A1 | 5/2022 | Lee et al. |

FOREIGN PATENT DOCUMENTS

| | | |
|---|---|---|
| CN | 206321884 U | 7/2017 |
| EP | 3139251 A1 | 3/2017 |
| JP | H10127769 A | 5/1998 |
| JP | 2019537287 A | 12/2019 |
| KR | 1020180113449 A | 10/2018 |
| WO | 201519625 A1 | 2/2015 |
| WO | 2015044851 A2 | 4/2015 |
| WO | 2018093181 A1 | 5/2018 |
| WO | 2019240564 A1 | 12/2019 |

OTHER PUBLICATIONS

Ifixit.com, "Razer OSVR HDK 2 Teardown", Published Aug. 10, 2016, Downloaded Jul. 15, 2017, https://www.fixit.com/Teardown/Razer+OSVR+HDK+2+Teardown/65804, 15 pp.
Ifixit.com, "PlayStation VR Teardown", Published Oct. 13, 2016, Downloaded Jul. 15, 2017, https://www.ifixit.com/Teardown/PlayStation+VR+Teardown/69341, 18 pp.
Ifixit.com, "Oculus Rift CV1 Teardown", Published Mar. 30, 2016, Downloaded Jul. 15, 2017, https://www.ifixit.com/Teardown/Oculus+Rift+CV1+Teardown/60612#s126787, 18 pp.
International Search Report and Written Opinion issued in International App. No. PCT/US2020/013443 dated Apr. 15, 2020 (15 pp).

* cited by examiner

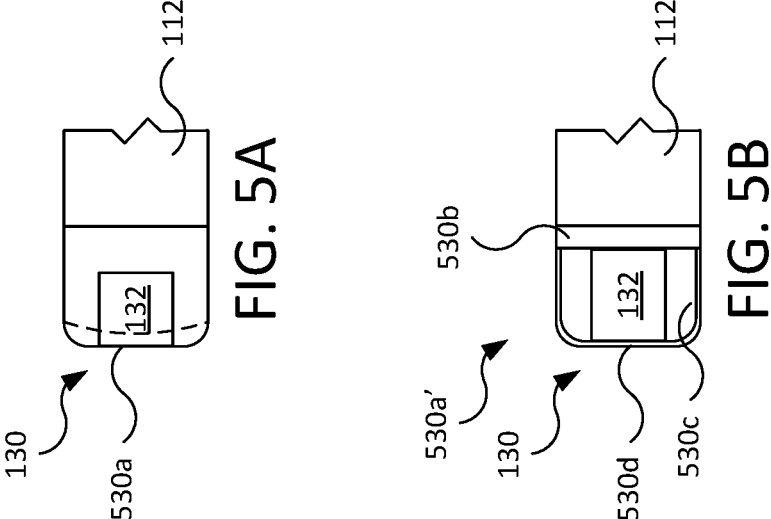
FIG. 5A
FIG. 5B
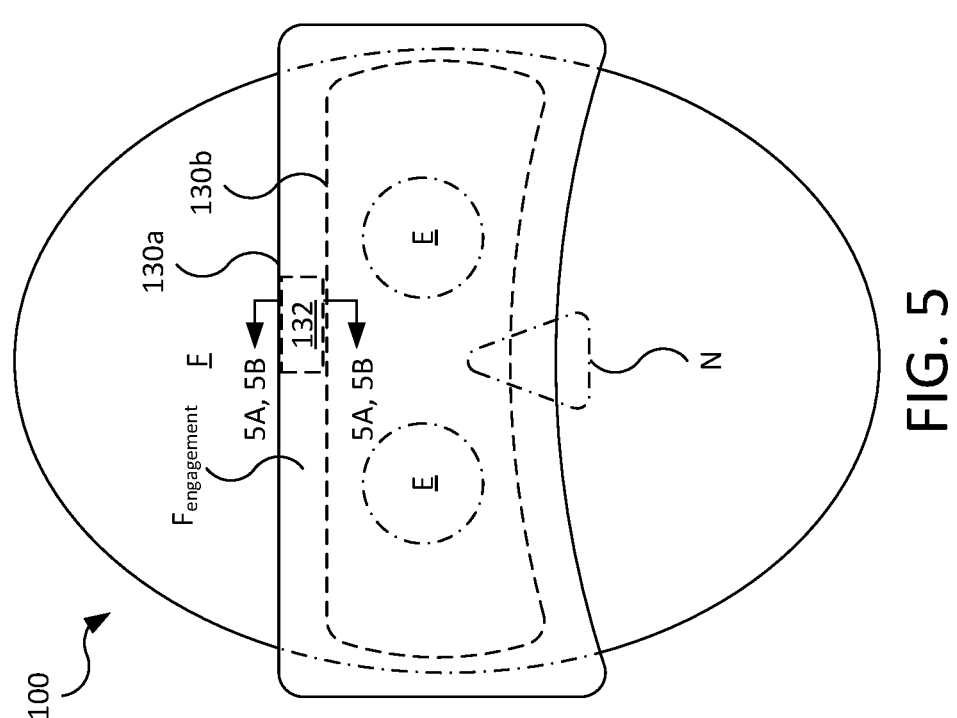
FIG. 5

| Force Sensor(s) 632a | Moisture Sensor(s) 632b | Temp. Sensor(s) 632c |
|---|---|---|
| Displ. Sensor(s) 632d | Capacitive Sensor(s) 632e | Electrode(s) 632f |
| Brain Activity Sensor(s) 632g | Muscle Activity Sensor(s) 632h | Heart Rate Sensor(s) 632i |

130

1100

1200

```
┌─────────────────────────────────────────────────────────┐
│                                                         │
│  Sense physiological conditions in a facial engagement  │
│                  region of a user                       │
│                       1210                              │
│                                                         │
└─────────────────────────────────────────────────────────┘
                            │
                            ▼
┌─────────────────────────────────────────────────────────┐
│                                                         │
│  Evaluate the physiological conditions to determine     │
│          facial shape characteristics of the user       │
│                       1220                              │
│                                                         │
└─────────────────────────────────────────────────────────┘
                            │
                            ▼
┌─────────────────────────────────────────────────────────┐
│                                                         │
│  Identify another suitable facial interface for the     │
│    user according to the facial shape characteristics   │
│                       1230                              │
│                                                         │
└─────────────────────────────────────────────────────────┘
```

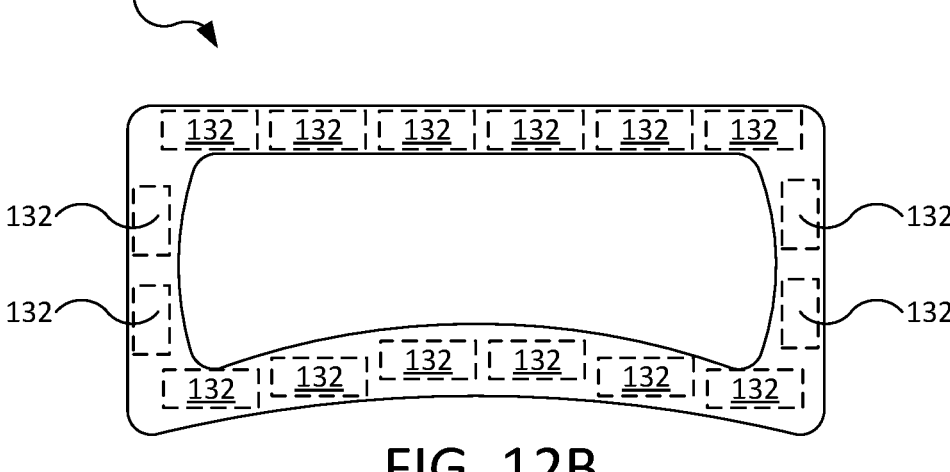

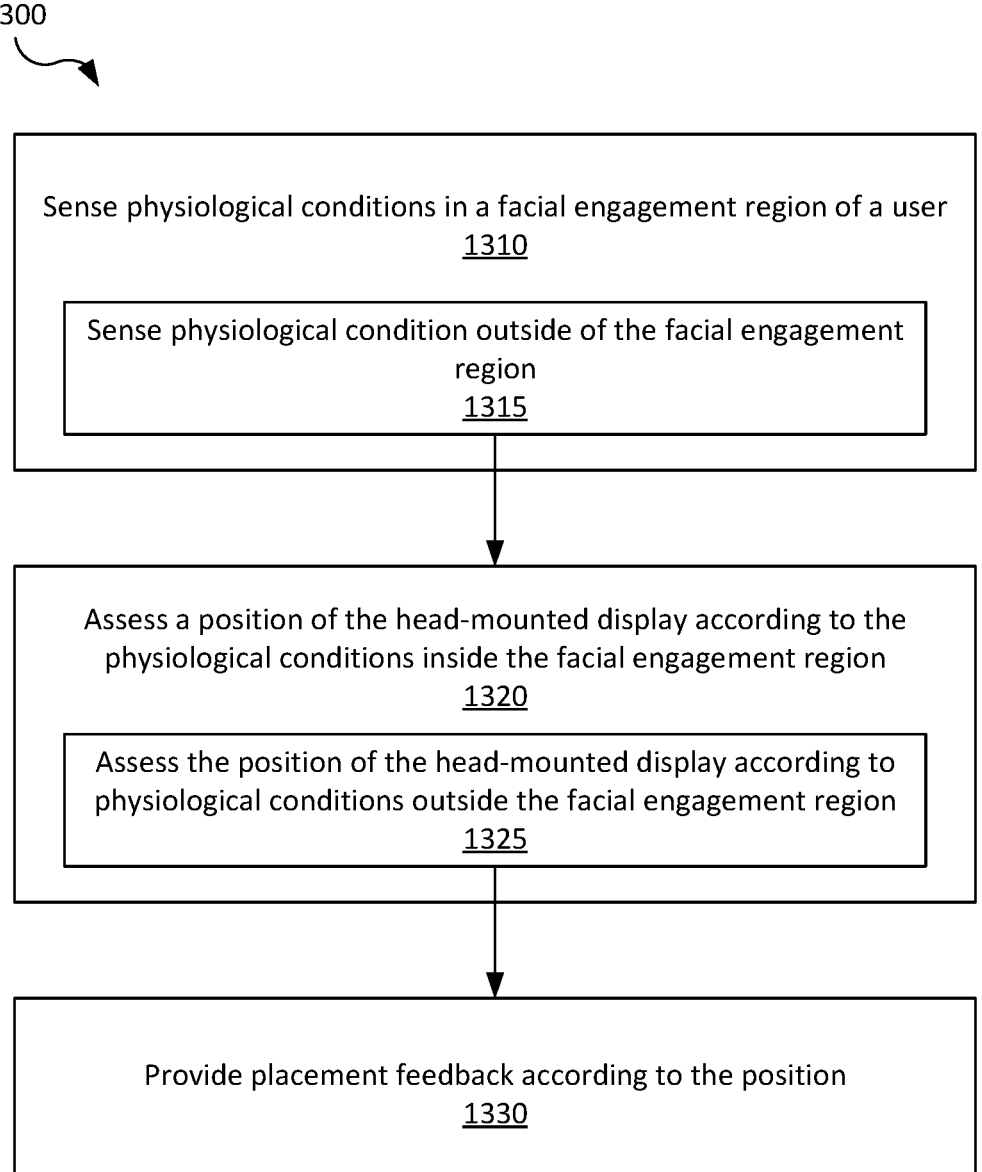

Sense physiological conditions in a facial engagement region of a user
1310

Sense physiological condition outside of the facial engagement region
1315

Assess a position of the head-mounted display according to the physiological conditions inside the facial engagement region
1320

Assess the position of the head-mounted display according to physiological conditions outside the facial engagement region
1325

Provide placement feedback according to the position
1330

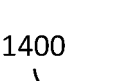

Sense a physiological conditions in a facial engagement region of a user
1410

Sense a different physiological condition inside or outside of the facial engagement region
1415

Assess an emotional state of the user according to the physiological conditions inside the facial engagement region
1420

Assess the emotional state according to both the physiological condition and the different physiological condition
1425

Vary graphical content according to the emotional state (e.g., to heighten or calm the emotional state)
1430

FIG. 14

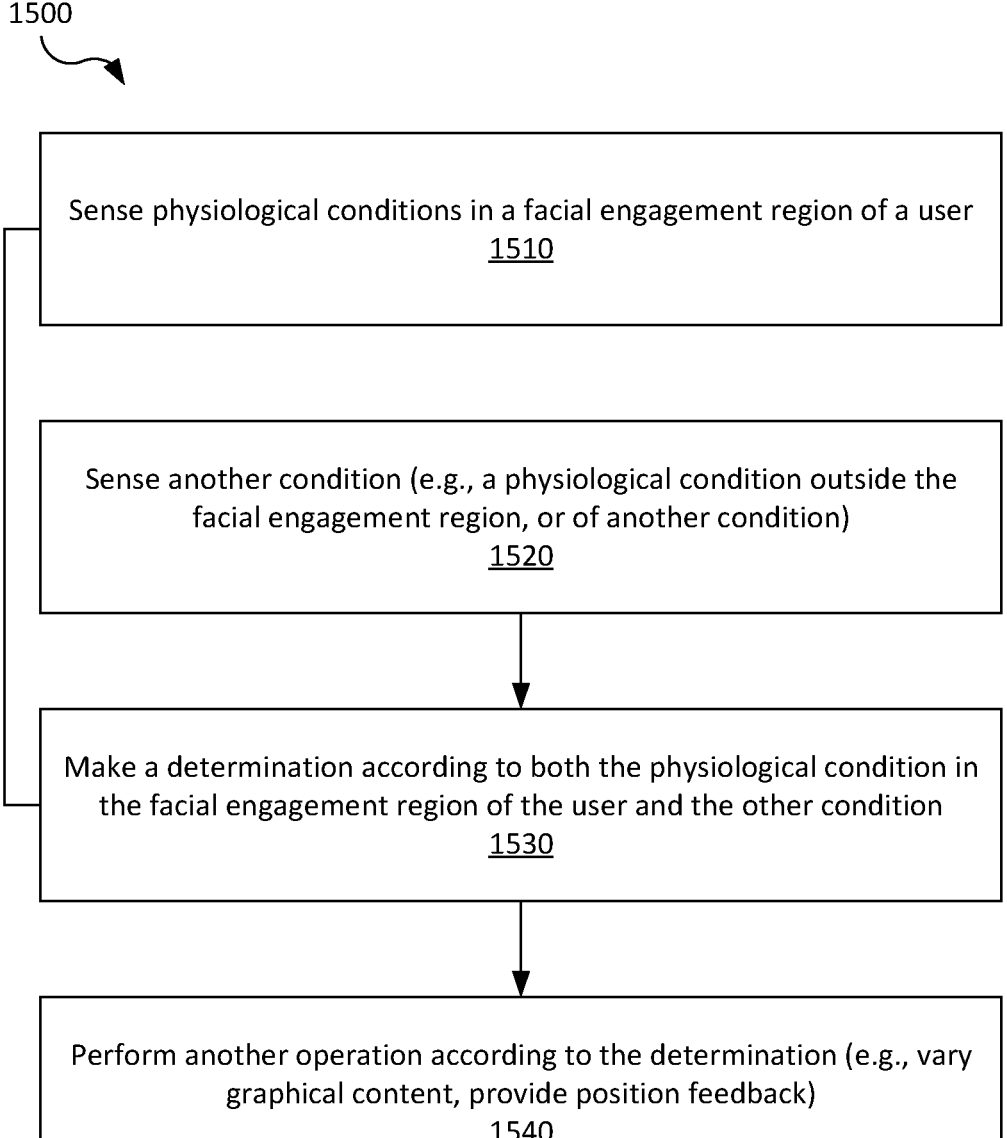

1500

Sense physiological conditions in a facial engagement region of a user
1510

Sense another condition (e.g., a physiological condition outside the facial engagement region, or of another condition)
1520

Make a determination according to both the physiological condition in the facial engagement region of the user and the other condition
1530

Perform another operation according to the determination (e.g., vary graphical content, provide position feedback)
1540

FIG. 15

HEAD-MOUNTED DISPLAY WITH FACIAL INTERFACE FOR SENSING PHYSIOLOGICAL CONDITIONS

CROSS-REFERENCE TO RELATED APPLICATION(S)

This application is a continuation of U.S. application Ser. No. 16/742,064, filed on Jan. 14, 2020, and claims priority to and the benefit of U.S. Provisional Application No. 62/793,466, filed on Jan. 17, 2019. The content of the foregoing application is incorporated herein by reference in its entirety for all purposes.

TECHNICAL FIELD

This disclosure relates to head-mounted displays and, in particular, sensing physiological conditions therewith.

BACKGROUND

Head-mounted displays are worn on heads of users and display graphical content thereto. A typical head-mounted display includes a display, a head support, and a facial interface. The display displays the graphical content. The head support is coupled to the display and engages the head of the user to support the display. The facial interface is coupled to the display and engages the face of the user to support the display. For example, for head-mounted displays that are used to display graphical content of a computer-generated environment, the facial interface may engage the face of the user substantially surrounding the eyes of the user to block substantially all ambient light from reach the eyes. The facial interface is typically made of or includes a compliant material (e.g., foam or rubber) that engages and conforms to the shape of the face.

The face of the user may provide various physiological information that may be used in various manners, for example, in delivering the graphical content with the head-mounted display. However, the facial interface may hide portions of the face from view of various physiological sensors and/or may influence physiological conditions that might otherwise provide valuable information. For example, the user may provide a facial expression that, absent facial contact with the facial interface, would take a certain form and would be observable, such as raising of brows for a surprised facial expression.

SUMMARY

Disclosed herein are implementations of head-mounted displays.

In an implementation, a head-mounted display includes a display unit and a facial interface. The display unit displays graphical content to the user. The facial interface is removably coupleable to the display unit and engages a facial engagement region of a face of the user whereby the display unit is supported on the face of the user. The facial interface includes a physiological sensor for sensing a physiological condition of the user in the facial engagement region.

In an implementation, a facial interface for a head-mounted display includes a compliant structure, a physiological sensor, a mechanical connector, and a data connector. The compliant structure engages a facial engagement region of a face of a user to support the head-mounted display thereon. The physiological sensor is coupled to the compliant structure for measuring a physiological condition of the user in the facial engagement region. The mechanical connector is coupled to the compliant structure and is removably coupleable to the head-mounted display. The data connector is coupled to the physiological sensor and sends physiological data from the physiological sensor to the head-mounted display.

In an implementation, a display system includes a head-mounted display and an electronic device that is physically separate from the head-mounted display. The head-mounted display includes a display unit for displaying graphical content to a user and a facial interface coupled to the display unit. The facial interface is configured to engage a facial engagement region of a face of the user for supporting the display unit on the face. The facial interface includes a physiological sensor for sensing a physiological condition of the user in the facial engagement region. The electronic device is in communication with the facial interface. The electronic device includes another sensor for sensing another condition. The head-mounted display forms a determination according to both the physiological condition and the other condition, and performs an operation according to the determination.

In an implementation, a display system includes a head mounted display having a display unit, a facial interface having a physiological sensor, and another physiological sensor. The display unit displays graphical content to a user. The facial interface is coupled to the display unit and is configured to engage a facial engagement region of a face of the user to support the display unit thereon. The facial interface includes a physiological sensor for sensing a physiological condition of the user in the facial engagement region. The other physiological sensor senses another physiological condition of the user outside the facial engagement region. The display system forms a determination according to both the physiological condition and the other physiological condition, and performs an operation according to the determination.

BRIEF DESCRIPTION OF THE DRAWINGS

In the drawings, dash-dash lines generally represent components that are hidden from view or are movable between states. Dash-dot lines generally represent portions of the user that are hidden from view.

FIG. 5 is a front view of the head-mounted display and the user depicting a facial engagement region on the user and a facial interface of the head-mounted display.

FIG. 5A is a cross-sectional view of the head-mounted display taken along line 5A-5A in FIG. 5.

FIG. 5B is a cross-sectional view of a variation of the head-mounted display taken along line 5B-5B in FIG. 5.

FIG. 12A is a flowchart of a method for identifying a suitable facial interface of a head-mounted display for a user.

FIG. 12B is a rear view of a facial interface for evaluating a face of a user for identifying the suitable facial interface.

FIG. 13 is a flowchart of a method for assessing placement of a head-mounted display.

FIG. 14 is a flowchart of a method for varying graphical content with a head-mounted display.

FIG. 15 is a flow chart of a method for operating a display system.

DETAILED DESCRIPTION

Disclosed herein are head-mounted displays and facial interfaces thereof, which sense physiological conditions in portions of a face of a user engaged by the facial interface itself. The facial interface may include one or more sensors and/or portions of sensors. Instead or additionally, the facial interface may include sensing windows that allow observation of those portions of the face that are engaged by the facial interface with sensors of the head-mounted display, such as in a display thereof.

The head-mounted display may also include sensors for sensing physiological conditions of the user in areas not engaged by the facial interface, such as with sensors of the head-mounted display that observe areas surrounded by or outward of the facial interface. The physiological information from areas engaged by the facial interface may be used in conjunction with physiological information from areas not engaged by the facial interface, for example, to make various determinations and/or provide various outputs in response thereto.

The facial interface may also be removably or interchangeably coupleable to the display. Thereby, facial interfaces of different sensing functionality and/or fit may be attached to the display, for example, according to different graphical content and/or different users. Furthermore, the facial interfaces may be removable for cleaning or replacement.

Figures 1, 2:
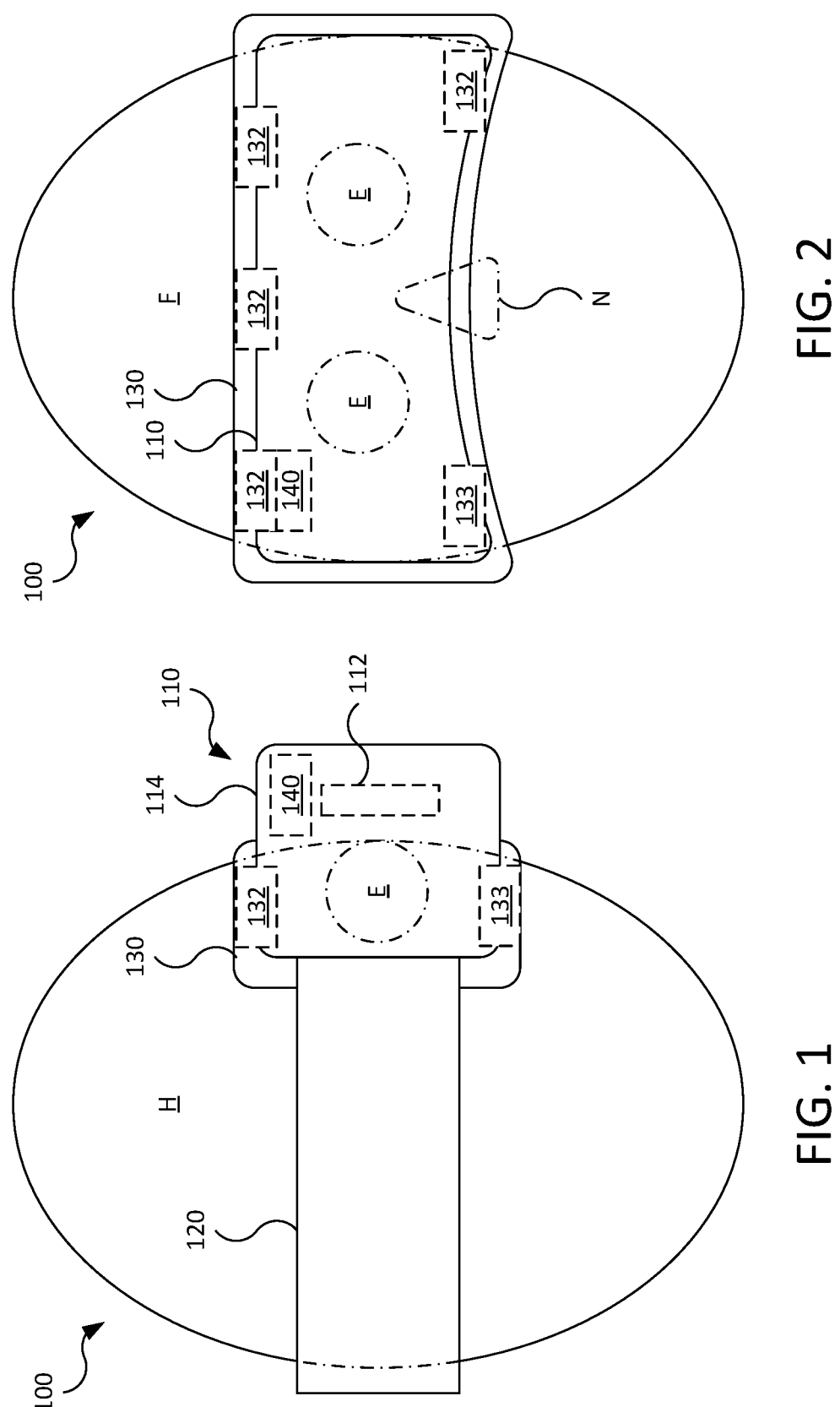
FIG. 1 is a side view of a head-mounted display worn on a head of a user with hidden component depicted in dash-dash lines and hidden portions of the user depicted in dash-dot lines.
FIG. 2 is a front view of the head-mounted display of FIG. 1 being worn on the head.

Referring to FIGS. 1 and 2, a head-mounted display 100 is wearable on a head H of a user and displays graphical content thereto, such as of a computer-generated environment (discussed in further detail below). The head-mounted display 100 generally includes a display unit 110, a head support 120, a facial interface 130, and electronics 140. The head-mounted display 100 may also be referred to as a display system.

The display unit 110 includes one or more display screens 112 that display the graphical content and a housing 114 to which the display screens 112 are coupled and which hides various components from view. The housing 114 may further function to block ambient light from reaching the eyes E of the user. The display unit 110 may, for example, be a dedicated-purpose device for displaying content while being worn on the head H of the user, as opposed to having a removable display screen, such as a smartphone that also is usable as a hand-held device. As such, the display screens 112 may be fixedly coupled, as opposed to being interchangeably coupleable, to the housing 114.

The head support 120 is coupled to the display unit 110 and engages the head H of the user to support the display unit 110 thereon. The head support 120 may, for example, be a band that extends around sides and a rear of the head H of the user. The head support 120 may be coupled to the housing 114 of the display unit 110.

The facial interface 130 is coupled to the display unit 110 and engages the face F of the user to support the display unit 110 thereon. For example, the facial interface 130 may be coupled to a rear end of the display unit 110 proximate the user, such as to the housing 114 (e.g., a rear surface or an inward end or surface), while the head support 120 may be in tension around the head H of user, thereby pressing the facial interface 130 generally rearward against the face F of the user. The facial interface 130 may be arranged generally between the face of the user and the display screens 112 (e.g., without the display screens 112 or portions thereof being between the facial interface 130 and the face of the user). The facial interface 130 may include one or more physiological sensors 132 that detect physiological conditions (e.g., conditions of the user) and may further include one or more haptic output devices 133, which are discussed in further detail below.

Figure 3:
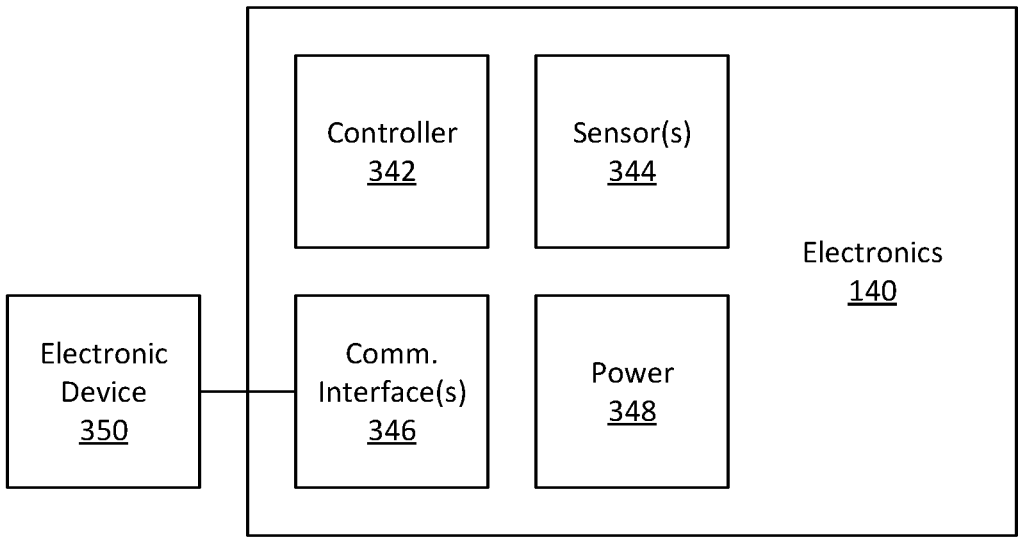
FIG. 3 is a schematic view of electronics of the head-mounted display.

The electronics 140 are electronic components for operation of the head-mounted display 100. The electronics 140 may be coupled to the display unit 110, for example, being contained within the housing 114. Some of the electronics 140 and/or other electronics of the display system may be positioned remotely from the display unit 110, such as another computing device in communication with the display unit 110 and/or the facial interface 130. Referring to FIG. 3, the electronics may generally include a controller 342, sensors 344, a communications interface 346, and power electronics 348, among others. The electronics 140 may also be considered to include the display screens 112 of the display unit 110. The controller 342 generally controls operations of the head-mounted display 100, for example, receiving input signals from the sensors 344 and/or the communications interface 346 and sending control signals to the display unit 110 (e.g., to the display screens 112) for outputting the graphical content. An example hardware configuration for the controller 342 is discussed below with reference to FIG. 4. The sensors 344 sense conditions of the user (e.g., physiological conditions), the head-mounted display 100 (e.g., position, orientation, movement), and/or the environment (e.g., sound, light, images). The sensors 344 may be any suitable type of sensor discussed below with reference to the (see, e.g., sensor types in FIG. 6). The communications interface 346 is configured to receive signals from an electronic device 350 that is physically separate from the head-mounted display 100. The power electronics 348 store and/or supply electric power for operating the head-mounted display and may, for example, include one or more batteries. The electronic device 350 may be a user input device (e.g., a user controller), another electronic device associated with the user (e.g., a smartphone or a wearable electronic device), or another electronic device not associated with the user (e.g., a server, smartphone associated with another person). The electronic device 350 may include sensors that may sense various other conditions of the user, such as location or movement thereof. The electronic device 350 may be considered part of a display system that includes the head-mounted display 100.

Figure 4:
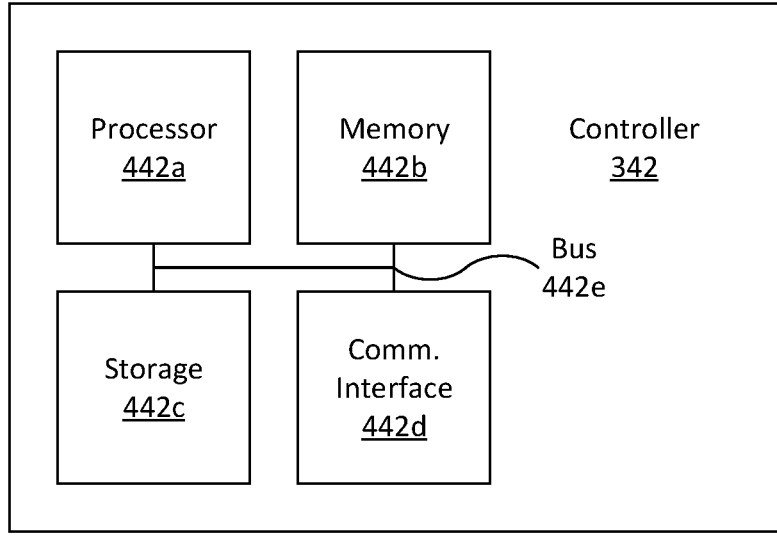
FIG. 4 is a schematic view of an example hardware configuration of a controller of the head-mounted display.

Referring to FIG. 4, the controller 342 may be used to implement the apparatuses, systems, and methods disclosed herein. For example, the controller 342 may receive various signals from various electronic components (e.g., the sensors 344 and the communications interface 346) and control output of the display screens 112 according thereto to display the graphical content. In an example hardware configuration, the controller 342 generally includes a processor 442*a*, a memory 442*b*, a storage 442*c*, a communications interface 442*d*, and a bus 442*e* by which the other components of the controller 342 are in communication. The processor 442*a* may be any suitable processor, such as a central processing unit, for executing computer instructions and performing operations described thereby. The memory 442*b* may be a volatile memory, such as random access memory (RAM). The storage 442*c* may be a non-volatile storage device, such as a hard disk drive (HDD) or a solid-state drive (SSD). The storage 442*c* may form a computer readable medium that stores instructions (e.g., code) executed by the processor 442*a* for operating the head-mounted display 100, for example, in the manners described above and below. The communications interface 442*d* is in communication with other electronic components (e.g., the sensors 344, the communications interface 346, and/or the display screens 112) for sending thereto and receiving therefrom various signals (e.g., control signals and/or sensor signals).

Referring to FIG. 5, the facial interface 130 engages the face F of the user in a facial engagement region $F_{engagement}$. As shown, the facial interface 130 extends around the eyes E of the user. The facial interface 130 engages the face F to block ambient light from reaching the eyes E by extending above, around sides of, and below the eyes E of the user. The facial engagement region $F_{engagement}$ additionally generally extends between an outer edge 130*a* and an inner edge 130*b* of the facial interface 130. The facial engagement region $F_{engagement}$, by virtue of being engaged by the facial interface 130, is substantially covered or hidden from view by the facial interface 130. Alternatively, the facial interface 130 may not extend fully around the eyes E of the user, for example, extending above but not below the eyes E, or having a gap in the region of the nose N of the user. For example, the facial engagement region $F_{engagement}$ may include only a forehead engagement region $FH_{engagement}$ (see, e.g., FIG. 8).

Referring to FIGS. 5A and 5B, the facial interface 130 is configured to be compliant, so as to comfortably engage and conform to the face F of the user. The facial interface 130 includes a compliant structure 530*a* that engages the face F of the user in the facial engagement region $F_{engagement}$ and to which the one or more physiological sensors 132 and/or the haptic output devices 133 (not shown) are coupled. The compliant structure 530*a* forms the general shape of the facial interface 130 (e.g., extending around the eyes E of the user, as shown in FIG. 5).

As shown in FIG. 5A, the compliant structure 530*a* may be a continuously-formed structure and may be compressed toward the housing 114 of the display unit 110 (e.g., such deflection illustrated by the dashed line). For example, the compliant structure 530*a* may be formed of an elastomer, such as rubber or silicone in which case the compliant structure 530*a* may directly engage the face F of the user. The physiological sensor 132 is surrounded by (e.g., recessed or embedded into) the compliant structure 530*a* and is arranged to sense the physiological condition, for example, being at an outer surface of the compliant structure 530*a* or otherwise in suitable proximity to the user.

As shown in FIG. 5B, a variation of the compliant structure 530*a*' is formed of multiple components, such as a backing layer 530*b* (e.g., a rigid or flexible plate formed of polymer, such as plastic) to which is coupled a compliant layer 530*c* (e.g., made of foam, rubber, or other compressible material). The compliant layer 530*c* may be further covered by a covering 530*d* that is flexible, such as a woven textile or other material (e.g., flexible sheet polymer). The covering 530*d* may also be used in conjunction with the compliant structure 530*a* as shown in FIG. 5A. The physiological sensor 132 is surrounded (e.g., recessed or embedded into) the compliant layer 530*c* and is arranged to sense the physiological condition of the user. For example, as referenced below, the physiological sensor 132 may be a force sensor 632*a* arranged in close proximity to (e.g., in contact with) the covering 530*d*. In another example, as referenced below, the physiological sensor 132 may be the electrode 632*f* or another bioelectric signal sensor (e.g., brain activity sensor 632*g*, muscle activity sensor 632*h*, or heart rate sensor 632*i*) in which case the covering 530*d* may be conductive in the region of the physiological sensor 132. The covering 530*d* may also be used in conjunction with the compliant structure 530*a*.

Figure 6:
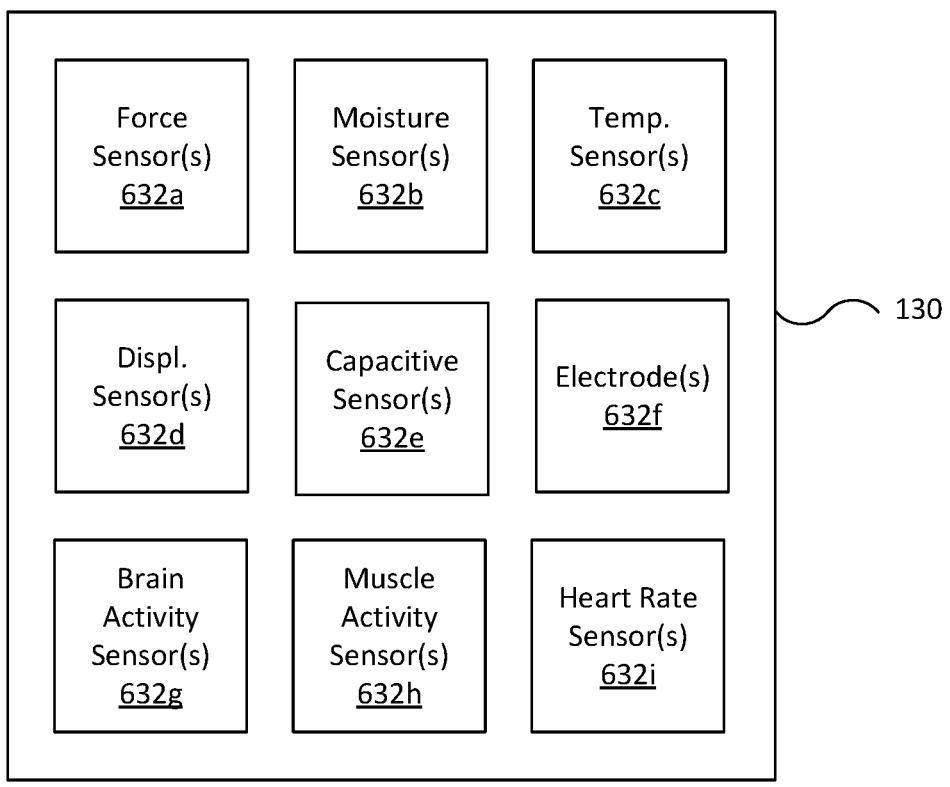
FIG. 6 is a schematic view of a facial interface with optional sensors thereof.

Referring to FIG. 6, the facial interface 130 includes one or more of the physiological sensors 132 that are used to sense one or more physiological conditions of the user in the facial engagement region $F_{engagement}$. The physiological sensor 132 may itself be a complete sensor that outputs a sensor signal according to the sensed physiological condition. For example, the physiological sensor 132 may be a force sensor that outputs an analog or digital signal according to the force sensed thereby. Alternatively, the physiological sensor 132 may be a component of a sensor system. For example, the physiological sensor 132 may be an electrode for electroencephalography (EEG) that is connected to a remote computing device (e.g., the controller 342) that in turn determines electrical activity of the brain of the user.

The one or more physiological sensors 132 may be configured to sense physiological conditions in the facial engagement region $F_{engagement}$, which may include force, temperature, moisture, displacement, capacitance, brain activity (e.g., EEG as mentioned above), muscle activity (e.g., via force sensors and/or electromyography (EMG)), and/or heart rate. While each of the various types of the physiological sensors 132 are depicted as part of the facial interface 130 (e.g., sensors 632*a* to 632*i*), it should be understood that the facial interface 130 may include none, one, or multiple of each type of the physiological sensors 132.

To measure force, the physiological sensor 132 may be a force sensor 632*a*, such as a spring displacement sensor (e.g., measuring displacement of a spring of known properties), a hydraulic or pneumatic load cell (e.g., measuring pressure of a contained fluid), a strain gauge, or a piezoelectric force sensor. The force sensor 632*a* may directly engage the face F of the user or may be hidden from view, for example, behind the covering 530*d* of the facial interface 130 (see FIG. 5B). In regions of the force sensor 632*a*, the covering 530*d* is preferably thin and/or generally incompressible, so as to provide accurate measurements of the force applied by the facial interface 130 to the face F of the user. Alternatively, the covering 530*d* may be compressible, so as to provide padding between the face F of the user and the force sensor 632*a* (e.g., being formed of or otherwise including a compressible material, such as a foam, silicone, or fabric).

To measure moisture, the physiological sensor 132 may be a moisture sensor 632*b*, such as a hygrometer or infrared moisture sensor. In the case of the moisture sensor 632*b* being a hygrometer, the moisture sensor 632*b* is in fluidic communication with the facial engagement region $F_{engagement}$ of the face F of the user. For example, the moisture sensor 632b may be arranged behind the covering 530d of the facial interface 130, such as behind a woven fabric or foam material through which moisture may travel.

To measure temperature, the physiological sensor 132 may be a temperature sensor 632c, such as a thermocouple, thermistor, a resistance thermometer, or an infrared temperature sensor. In the cases of the thermocouple, the thermistor, or the resistance thermometer, the temperature sensor 632c may be arranged in direct contact with the facial engagement region $F_{engagement}$ of the face F of the user, or otherwise be in a thermally conductive relationship therewith (e.g., being behind and conductively coupled to a highly thermally conductive material of the covering 530d). In the case of the infrared temperature sensor, the temperature sensor 632c is able to sense infrared radiation of the facial engagement region $F_{engagement}$ of the face F of the user either directly or as thermally conducted to an intervening material (e.g., of the covering 530d) by the facial engagement region $F_{engagement}$ of the face F of the user.

To measure displacement, the physiological sensor 132 may be a displacement sensor 632d, such as a contact-type displacement gauge. As the facial engagement region $F_{engagement}$ of the face F moves, the displacement sensor 632d is moved and the displacement thereof measured.

To measure capacitance, the physiological sensor 132 may be a capacitive sensor 632e of suitable type.

To measure brain activity (e.g., electroencephalography or EEG), muscle activity (e.g., electromyography or EMG), and/or heart rate (e.g., electrocardiography or ECG), the physiological sensor 132 may be a suitable bioelectric signal sensor. In one example, the bioelectric signal sensor is an electrode 632f. It should be noted that the electrode 632f may take different forms depending on the physiological condition sensed (e.g., being physically different for sensing different bioelectric activity (e.g., bioelectric signals), such as brain activity, muscle activity, or heart activity). The electrode 632f may be incorporated into the covering 530d, for example, having a conductive fiber that is woven into a woven fabric of the covering 530d. Alternatively, the electrode 632f may be formed of another material and arranged to directly contact the facial engagement region $F_{engagement}$ of the face F of the user.

Instead of being an electrode 632f, the physiological sensor 132 may be a brain activity sensor 632g (e.g., an EEG sensor) that contacts the face F to measure brain activity, a muscle activity sensor 632h (e.g., an EMG sensor) that contacts the face F to measure muscle activity, or a heart rate sensor 632i that contacts or observes the face F to measure heart rate.

Figure 7:
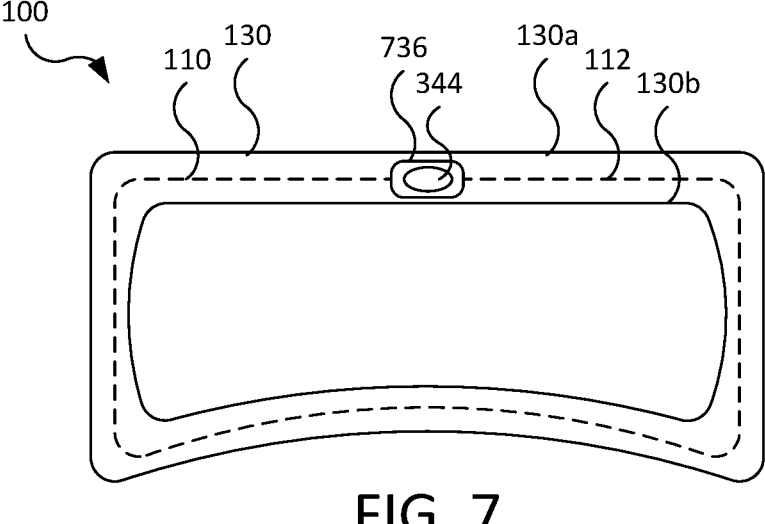
FIG. 7 is a rear view of the head-mounted display of FIG. 1.

Referring to FIG. 7, the facial interface 130 may include a window 736 by which the facial engagement region $F_{engagement}$ is optically observable. For example, the window 736 may be formed in the covering 530d, while one of the sensors 344 coupled to the display unit 110 observes the facial engagement region $F_{engagement}$ therebehind to sense conditions of the user (e.g., a camera for measuring facial movements of the user, an optical heart rate sensor having an optical emitter and a detector, or an infrared sensor).

Figure 8:
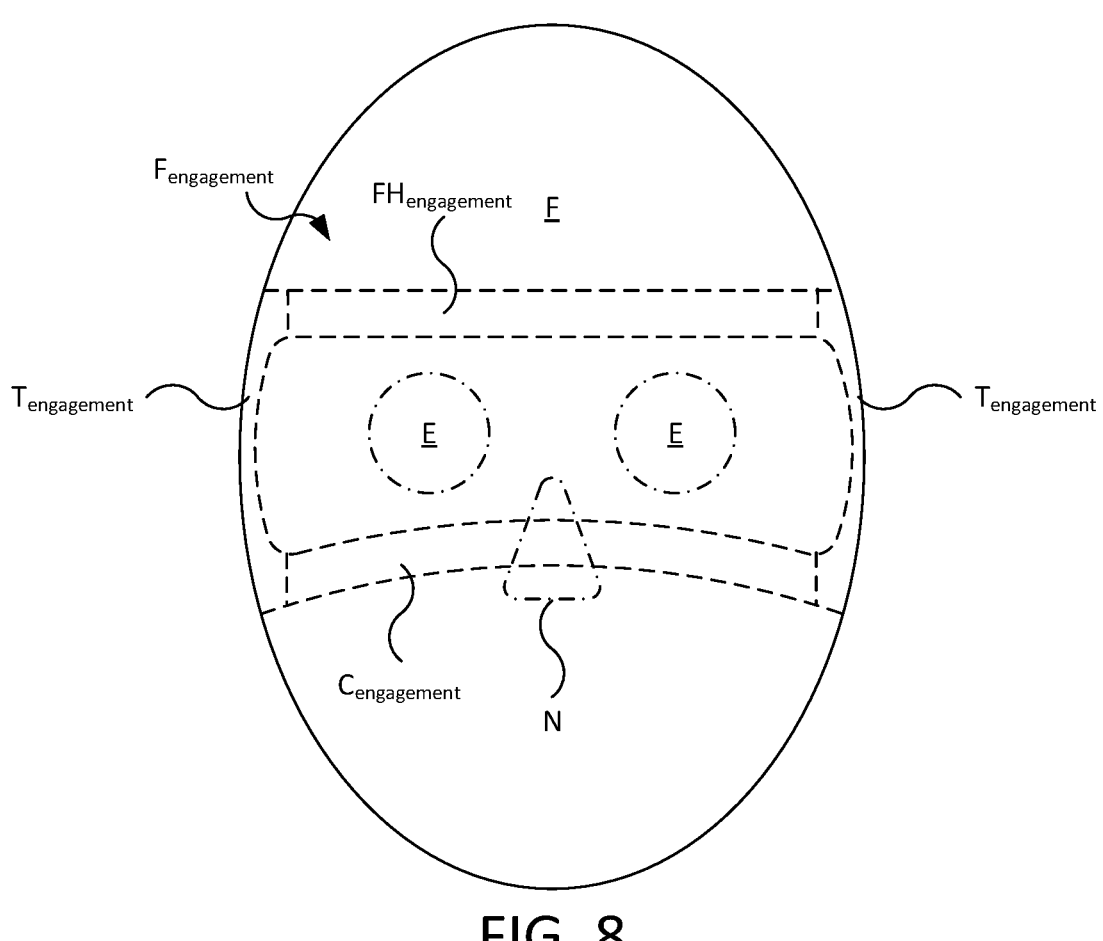
FIG. 8 is a front view of the user further illustrating the facial engagement region.

Referring to FIG. 8, the one or more physiological sensors 132 may be provided in one or more suitable locations in the facial engagement region $F_{engagement}$ of the face F of the user for measuring the physiological condition associated therewith (e.g., force, moisture, temperature, displacement, brain activity, muscle activity, or heart activity). For example, one of more of the physiological sensors 132 may be arranged in of a forehead engagement region $FH_{engagement}$, a temple engagement region $T_{engagement}$, and/or a cheek engagement region $C_{engagement}$ of the facial engagement region $F_{engagement}$ of the face F of the user. The force sensors 632a may be arranged in areas where pressure is desirable to be measured, for example, to detect particular facial expressions or to assess comfort, such as in the forehead engagement region $FH_{engagement}$, the temple engagement region $T_{engagement}$, or the cheek engagement region $C_{engagement}$. The brain activity sensors 632g may be positioned where brain activity may be measurable, such as in the forehead engagement region $FH_{engagement}$. The muscle activity sensors 632h may be arranged where facial movement may be measured, for example, to assess facial expressions, such as in the forehead engagement region $FH_{engagement}$, the temple engagement region $T_{engagement}$, and/or the cheek engagement region $C_{engagement}$. The heart rate sensor 632i may be arranged where the heart rate may be optically sensed, such as in the temple engagement region $T_{engagement}$, or where the heart rate may be electrically measurable, such as in the forehead engagement region $FH_{engagement}$.

Figure 9:
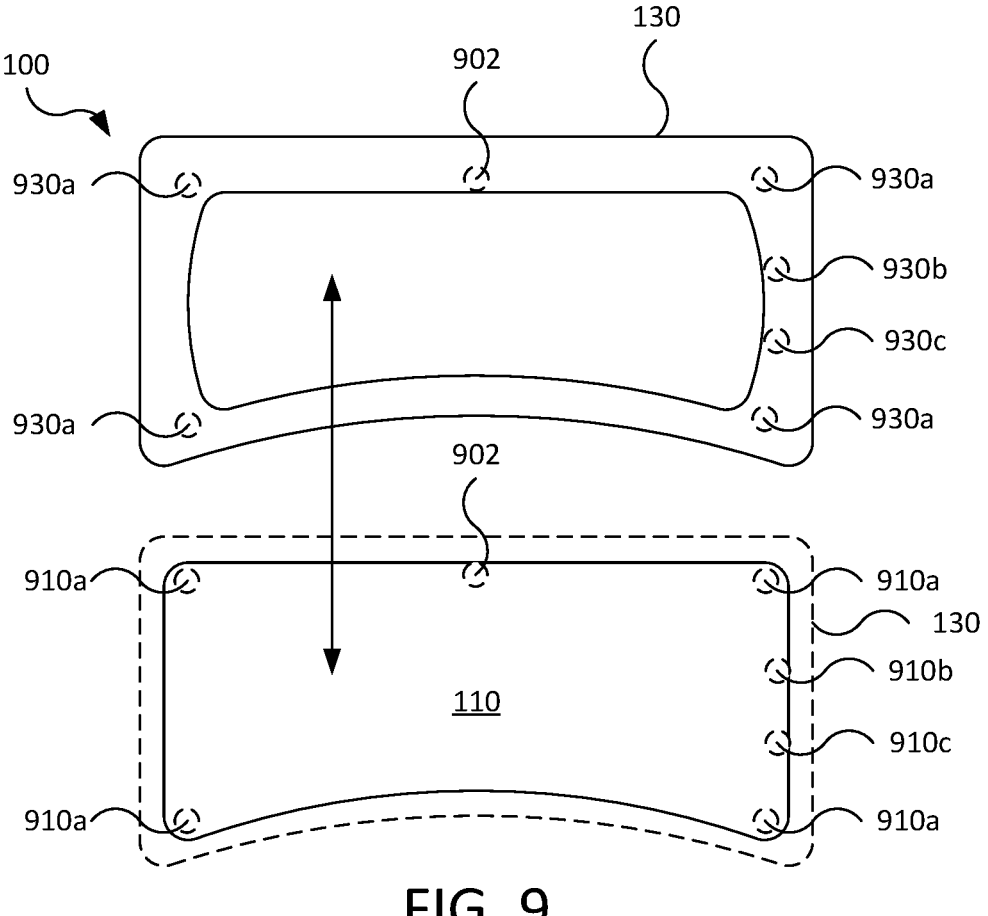
FIG. 9 is a rear view of the head-mounted display with the facial interface in a decoupled configuration (solid lines) and a coupled configuration (dashed lines).
Figure 10:
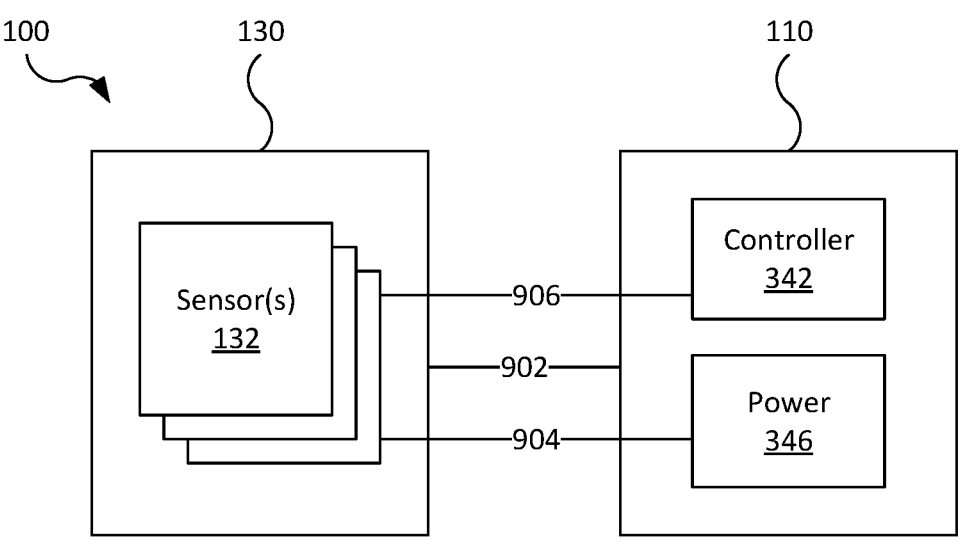
FIG. 10 is a schematic view of the head-mounted display including mechanical, power, and data connections.

Referring to FIGS. 9-10, the facial interface 130 may be removably coupleable to the display unit 110. The head-mounted display 100 forms mechanical connections 902 at one or more locations, one or more power connections 904, and one or more data connections 906 between the facial interface 130 and the display unit 110.

The mechanical connections 902 mechanically couple the facial interface 130 to the display unit 110, such that the facial interface 130 and the display unit 110 may be supported by each other, such as for the facial interface 130 to support the display unit 110 on the face F of the user. The mechanical connections 902 may, for example, be formed magnetically (e.g., permanent magnets and corresponding permanent magnets or attractor plates), with hook and loop fasteners, with an interference fit (e.g., a forward end of the facial interface 130 fitting tightly within or around the display unit 110), with protrusions that passively engage corresponding slots or recesses, with mechanisms (e.g., latches), or combinations thereof. The mechanical connections 902 may be formed at one or more locations, for example, with facial interface mechanical connectors 930a distributed about the facial interface 130 (e.g., being coupled to the compliant structure 530a) and display unit mechanical connectors 910a distributed about the display unit 110 at corresponding locations (e.g., being coupled to the housing 114).

The power connection 904 transfers electrical power between the display unit 110 and the facial interface 130, such as to the facial interface 130 to be powered by the display unit 110 (e.g., the physiological sensors 132 of the facial interface 130 being powered by the display unit 110). The power connection 904 may be formed in any suitable manner, such as conductively (e.g., stationary contacts engaged by spring contacts, or a plug and corresponding receptacle) or wirelessly (e.g., with corresponding induction coils). The power connection 904 may be formed at one or more locations, for example, with a facial interface power connector 930b on the facial interface 130 and a display unit power connector 910b on the display unit 110 at a corresponding location. The facial interface power connector 930b is coupled to the one or more physiological sensors 132 to provide power thereto. The display unit power connector 910b is coupled to the power electronics 348, directly or indirectly, to transfer power therefrom.

The data connection 906 transfers data between the display unit 110 and the facial interface 130, such as control signals from the display unit 110 (e.g., the controller 342 thereof) to the facial interface 130 (e.g., the physiological sensors 132 and/or the haptic output devices 133 thereof) and/or sensor signals from the facial interface 130 (e.g., the physiological sensors 132 thereof) to the display unit 110 (e.g., the controller 342 thereof). The data connection 906 may be formed in any suitable manner, such as conductively (e.g., stationary contacts engaged by spring contacts, or a plug and corresponding receptacle) or wirelessly (e.g., wireless transceivers using suitable protocols, such as Bluetooth). The data connection 906 may be formed at one or more locations, for example, with a facial interface data connector 930*c* on the facial interface 130 and a display unit data connector 910*c* on the display unit 110 at a corresponding location. The facial interface data connector 930*c* is coupled to the one or more physiological sensors 132, directly or indirectly, for example, to transfer control signals thereto and/or sensor signals therefrom (e.g., communicating sensed physiological information). The display unit data connector 910*c* is coupled to the controller 342, directly or indirectly, for example, to transfer the control signals therefrom and/or the sensor signals thereto (e.g., to received sensed physiological information).

The power connection 904 and the data connection 906 may both be formed by a common connection system, such as a plug and receptacle system capable of transferring both power and data. For example, the power connection 904 and the data connection 906 may be formed with a suitable type of Universal Serial Bus (USB) connectors, such as USB Type C.

The head-mounted display 100 and, in particular the display unit 110 thereof, may be configured to interchangeably couple to different facial interfaces 130. The different facial interfaces 130 may differ, for example, by size and/or shape (e.g., such that the display unit 110 may be used with people having different sized faces F). The different facial interfaces 130 may instead or additionally differ by the configuration the physiological sensors 132 thereof, for example, by having different types of the physiological sensors 132 (e.g., sensors 632*a* to 632*i*), numbers of the physiological sensors 132, and/or placement of the physiological sensors 132. By providing different facial interfaces 130 with differently configured physiological sensors 132, different functions may be provided thereby. For example, one facial interface 130 may include one or more of the brain activity sensors 632*g* and/or one or more of the electrodes 632*f* for monitoring brain activity, while another facial interface 130 may include the force sensors 632*a*. The different facial interfaces 130 may be interchangeably coupleable to the display unit 110, for example, by forming the mechanical connections 902, the power connections 904, and/or the data connections 906 with the display unit 110 in the same manner as each other. For example, the two different facial interfaces 130 form the power connection 904 and/or the data connections 906 with a common type of power connectors 910*b*, 930*b* and/or the data connectors 910*c*, 930*c*, such as with a standardized connector (e.g., USB-C) capable of forming both the power connection 904 and the data connection 906.

Referring to FIGS. 11-15, the physiological information sensed with the one or more physiological sensors 132 in the facial engagement region F$_{engagement}$ may be used in various different manners, for example, for physiological identification, assessing user fit, assessing and/or guiding placement, varying graphical content, and simply outputting physiological information for other purposes, such as individual health monitoring, multi-person health studies, or yet-to-be determined uses. Furthermore, in one or more of the various uses of the physiological sensors 132, the head-mounted display 100 may further utilize information from the sensors 344 of the electronics 140, for example, to supplement, confirm, and/or negate assessments using the physiological information sensed with the one or more physiological sensors 132 in the facial engagement region F$_{engagement}$. The sensors 344 may, for example, sense physiological conditions of the user in areas surrounded by the facial engagement region F$_{engagement}$ (e.g., surrounded by the facial interface 130), such as conditions or characteristics of the eye E of the user.

Figure 11:
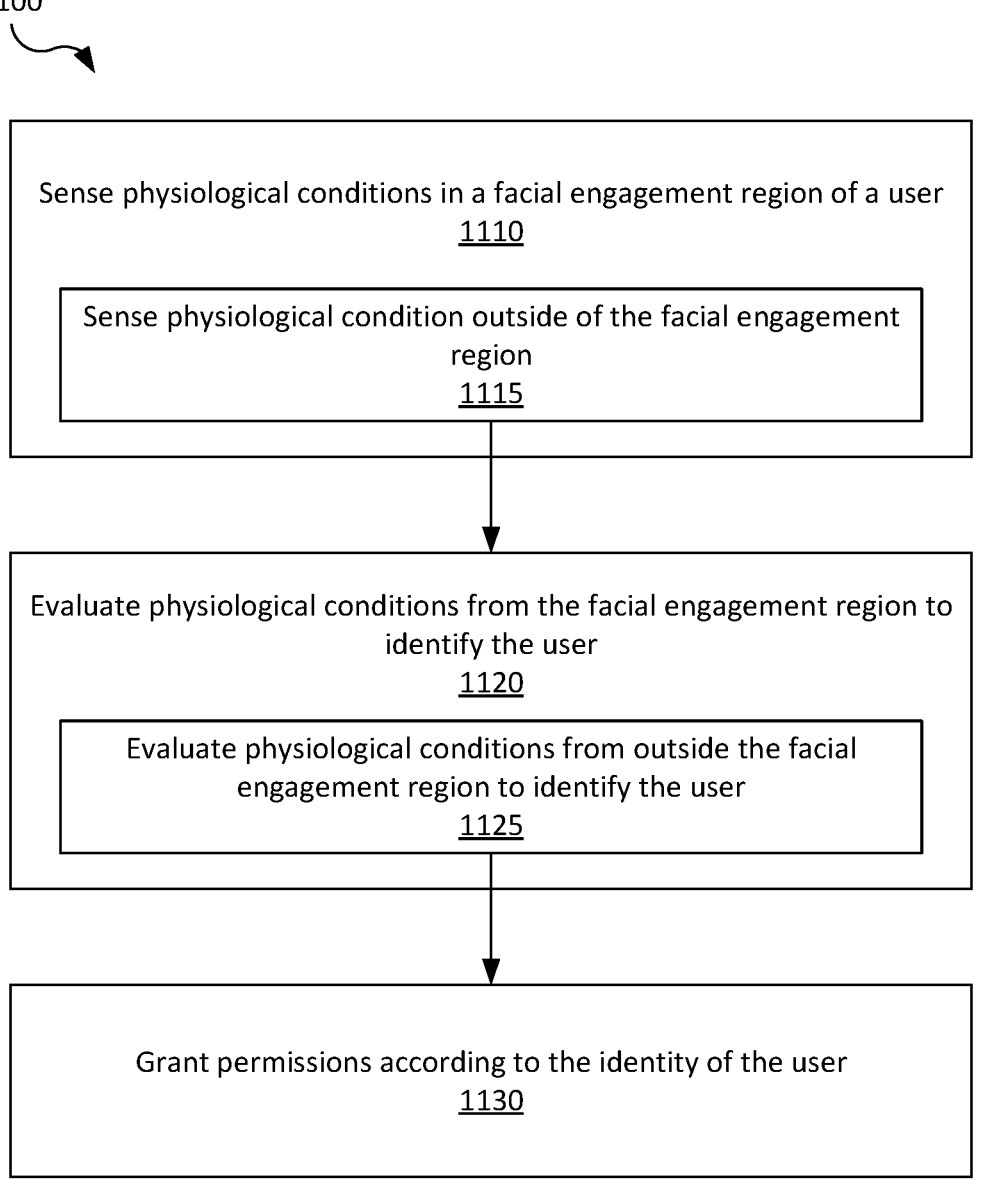
FIG. 11 is a flowchart of a method for physiological identification of a user with a head-mounted display.

Referring to FIG. 11, a method 1100 is provided for physiological authentication with a head-mounted display. Physiological conditions are sensed in a first operation 1110, the physiological conditions are evaluated to identify or authenticate a user in a second operation 1120, and upon identifying or authenticating the user, permission is granted to the user in a third operation 1130.

In the first operation 1110, the physiological conditions are sensed with one or more sensors in the facial engagement region F$_{engagement}$, such as with one of the physiological sensors 132, for example, in conjunction with the controller 342. The physiological conditions may, for example, include force and/or displacement measurements at various locations (e.g., for determining a shape of the face F or facial features of the user) or bioelectric signals suitable for identifying the user.

The first operation 1110 may further include a suboperation 1115 in which physiological conditions of the user are additionally sensed in facial regions outside of the facial engagement region F$_{engagement}$ (i.e., in regions not engaged by the facial interface 130). For example, one of the sensors 344 (e.g., a camera) of the electronics 140 of the display unit 110 may sense conditions of one or more of the eyes E of the user.

In the second operation 1120, the physiological conditions sensed in the first operation 1110 are evaluated with a computing device, such as the controller 342, to identify or authenticate the user. For example, the physiological conditions are compared against those previously measured or determined of one or more approved users. If the sensed physiological conditions match or otherwise favorably compare to those previously measured conditions of the user, the user is considered identified or authenticated.

The second operation 1120 may further include a suboperation 1125 in which the physiological conditions sensed in the facial regions outside of the facial engagement region F$_{engagement}$ are evaluated. For example, the physiological conditions from outside of the facial engagement region F$_{engagement}$ are compared against those previously measured or determined of the one or more approved users. If both the physiological conditions within and outside the facial engagement region F$_{engagement}$ match or otherwise favorably compare to those previously measured conditions, the user is considered identified or authenticated.

In the third operation 1130, according to the identification or authentication determined in the second operation 1120, the head-mounted display 100 provides the user one or more permissions, for example, to access different functionality (e.g., graphical content) of the head-mounted display 100.

Referring to FIGS. 12A and 12B, a method 1200 is provided for determining a suitable facial interface for a user. Physiological conditions of a user are sensed in a first operation 1210, the sensed physiological conditions are then compared to physiological criteria of different facial interfaces in a second operation 1220, and one of the different facial interfaces is identified in a third operation 1230.

In the first operation 1210, the physiological conditions of the user are sensed with a facial interface 130, such as a variation of the facial interface 1230a shown in FIG. 12B that includes the physiological sensors 132 distributed thereabout (e.g., above, below, and/or along sides of the eyes E of the user). The physiological sensors 132 are of a type suitable for measuring the shape of the face F of the user or features thereof, such as the force sensor 632a (e.g., force distribution about the facial engagement region F$_{engagement}$) or the displacement sensors 632d.

In the second operation 1220, the physiological conditions sensed in the first operation 1210 are evaluated with a computing device, such as the controller 342 of the head-mounted display 100, to determine facial shape characteristics. For example, the facial shape may be broadly characterized (e.g., by size and/or ethnicity) based on the physiological conditions, or facial shape characteristics may be more discretely characterized (e.g., size and relative position of individual features, such as a brow and nose of the user).

In the third operation 1230, the facial shape characteristics are compared to corresponding characteristics of different facial interfaces with the computing device, such as the facial interfaces 130 or other facial interfaces that lack the physiological sensors 132, so as to identify one or more suitable ones of the facial interfaces for face F of the user. For example, different facial interfaces 130 having different sizes or shapes may have acceptable ranges of values for the facial shape characteristics, and a suitable facial interface 130 for the user is identified if the facial shape characteristics fall within the acceptable ranges thereof.

Referring to FIG. 13, a method 1300 is provided for assessing placement of a head-mounted display 100. A physiological condition is sensed in a first operation 1310, a position is assessed in a second operation 1320, and placement feedback is provided in a third operation 1330.

In the first operation 1310, the physiological condition is sensed with a sensor, such as one of the physiological sensors 132 suitable for evaluating placement of the facial interface 130 on the face F of the user. For example, the physiological sensors 132 may be one or more of the force sensors 632a or the displacement sensors 632d (e.g., by which the shape or facial characteristics of the face F may be determined), the capacitive sensors 632e, or suitable ones of the bioelectric signal sensors.

The first operation 1310 may further include a first suboperation 1315 in which physiological conditions of the user are additionally sensed in facial regions outside of the facial engagement region F$_{engagement}$ (i.e., in regions not engaged by the facial interface 130). For example, one of the sensors 344 of the electronics 140 of the display unit 110 may sense conditions of one or more of the eyes E of the user (e.g., locations of the eyes E, for example, using a camera and image recognition).

In the second operation 1320, the position is assessed according to the physiological condition sensed in the first operation 1310 with a computing device, such as the controller 342. For example, proper contact with face F of the user may be evaluated by comparing the physiological conditions sensed by the force sensors 632a, the capacitive sensors 632e, and the capacitive sensors 632e to such physiological conditions sensed at a previous time when the facial interface 130 was properly positioned on the face of the user.

The second operation 1320 may further include a suboperation 1325 in which the physiological conditions sensed in the facial regions outside of the facial engagement region F$_{engagement}$ are evaluated. For example, the position of the head-mounted display 100 on the face F of the user may be further evaluated according to the sensed positions of the eyes E of the user.

In the third operation 1330, the placement feedback (e.g., a position indication) is provided according to (e.g., regarding) the position assessment determined in the second operation 1320, for example, as graphical feedback output by the display unit 110, as audio feedback output by an audio output device, or haptic feedback output by the haptic output device 133, as may be controlled by the computing device. The placement feedback may be binary (e.g., a negative indication if the facial interface 130 is not in proper position on the face F of the user), or may be instructive (e.g., providing the user instructions on how to move the head-mounted display 100 into proper position).

Referring to FIG. 14, a method 1400 is provided for varying graphical content with a head-mounted display. A physiological condition is sensed in a first operation 1410, a user emotional state is assessed in a second operation 1420, and the graphical content is varied according to the user emotional state in a third operation 1430.

In the first operation 1410, the physiological condition is sensed with a sensor, such as one of the physiological sensors 132 suitable for evaluating the emotional state of the user. For example, the physiological sensors 132 may be one or more of the bioelectric signal sensors, such as the electrodes 632f, the brain activity sensors 632g, the muscle activity sensors 632h, and/or the heart rate sensors 632i. Elevated brain activity, muscle activity, or heart rate may indicate a heightened emotional state, while lower brain activity, muscle activity, or heart rate may indicate a calm emotional state. The first operation 1410 may include a suboperation 1415 in which another physiological condition is sensed, which is of a different type. The other physiological condition may be sensed within or outside of the facial engagement region F$_{engagement}$. For example, when a user attempts a natural facial expression (e.g., a smile), which may be inhibited by the facial interface 130, muscle activity sensors 632h and force sensors 632a may each sense physiological conditions indicative of the facial expression.

In the second operation 1420, the user emotional state is assessed according to the physiological condition sensed in the first operation 1410 with a computing device, such as the controller 342. For example, the brain activity, muscle activity, or heart rate may be compared to an upper threshold (e.g., above which the user is determined to be in a heightened emotional state), be compared to a lower threshold (e.g., below which the user is determined to be in a calm emotional state), assessed for a trend (e.g., if increasing or decreasing the user is determined to be moving, respectively, toward a heightened or calm emotional state), or other criteria (e.g., patterns in bioelectric signals). The second operation 1420 may include a suboperation 1425 in which the other physiological condition is evaluated. For example, a determination of the emotional state may be based on both the first physiological condition and the second (e.g., other) physiological condition.

In other examples, the force sensors 632a and/or the displacement sensors 632d may be used to identify facial expressions indicative of the emotional state of the user (e.g., facial expressions indicating surprise or calm).

In the third operation 1430, the graphical content is varied according to the user emotional state determined in the second operation 1420. The graphical content may, for example, be varied to induce or maintain the elevated emotional state (e.g., by displaying more rapidly moving graphical content) or the calm emotional state (e.g., by displaying less rapidly moving graphical content). The graphical content may also be varied according to the nature of the software program according to which the graphical content is delivered. For example, for software programs intended to induce a high emotional state, the graphical content may be provided in a manner intended to change the emotional state of the user away from the calm emotional state. For software programs intended to relax the user, the graphical content may be provided in a manner intended to change the emotional state of the user away from the heightened emotional state.

Referring to FIG. 15, a method 1500 is provided for operating a head-mounted display according to physiological conditions sensed in a facial engagement region $F_{engagement}$ the user and another condition. The physiological condition is sensed in a first operation 1510, another condition is sensed in a second operation 1520, a determination is made according to both the physiological condition and the other condition in a third operation 1530, and an operation is performed according to the determination in a fourth operation 1540.

In the first operation 1510, the physiological condition is sensed with a sensor, such as the physiological sensor 132, in the facial engagement region $F_{engagement}$ of the face F of the user. The physiological sensor 132 may be any of the sensor types described above (e.g., 632*a* to 632*i*) and the physiological condition may be any of the physiological conditions discussed above.

In the second operation 1520, another condition is sensed with another sensor. The other sensor may be another sensor of the head-mounted display 100, such as the sensor 344, in which case the sensor 344 may sense another physiological condition of the user in another facial region outside of the facial engagement region $F_{engagement}$ (e.g., eye position) or another condition (e.g., movement of the head-mounted display). Alternatively, the other sensor may be a sensor of the electronic device 350 in which the other condition may be movement of the electronic device 350 (e.g., indicating movement of the user).

In the third operation 1530, a determination is made according to both the physiological condition sensed in the first operation 1510 and the other condition sensed in the second operation 1520. The determination is made by a computing device, such as the controller 342. The determination requires both the physiological condition and the other condition as inputs. In one example, the determination may be that the head-mounted display is out of position, which may be determined according to both the physiological condition of unevenly distributed force and the other condition of the eyes E of the user being offset relative to the display unit 110. In another example, the determination may be that the user is highly active, which may be determined according to both the physiological condition of high brain activity and the other condition high movement of the electronic device 350.

In the fourth operation 1540, a further operation is performed according to the determination made in the third operation 1530. Various examples of the further operations include providing binary or instructive position feedback (discussed above) or varying graphical content (e.g., displaying rapidly changing graphics of the user is highly active).

A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

In contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.

Examples of CGR include virtual reality and mixed reality.

A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationary with respect to the physical ground.

Examples of mixed realities include augmented reality and augmented virtuality.

An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

As described above, one aspect of the present technology is the gathering and use of data available from various sources, including sensing physiological conditions of the user. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to for user identification and varying graphical content, among other uses. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of varying content or authenticating a user, the present technology can be configured to allow users to select to "opt in" or "opt out" of participation in the collection of personal information data during registration for services or anytime thereafter. In another example, users can select not to provide various physiological for varying graphical content or other uses, such as health studies. In yet another example, users can select to limit times at which physiological data is sensed (e.g., only during authentication). In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, graphical content may be varied based on non-personal information data or a bare minimum amount of personal information, such as the content being requested by the device associated with a user, other non-personal information, or publicly available information.

What is claimed is:

1. A head-mounted display, comprising:
a display unit for displaying graphical content to a user;
a facial interface interchangeably coupled to the display unit and configured to engage a facial engagement region of a face of the user, wherein the facial engagement region engages a face of the user above and below eyes of the user;
one or more of a force sensor or a displacement sensor embedded in the facial interface and configured to generate a signal indicative of a facial shape characteristic of the facial engagement region; and
a controller configured to:
assess, based on the signal, a position of the facial interface relative to the face of the user, and
based on the assessment, provide feedback to the user regarding the position of the facial interface relative to the face of the user.

2. The head-mounted display of claim 1, wherein the display unit is configured to provide the feedback as a graphical feedback output.

3. The head-mounted display of claim 1, wherein an audio output device is configured to provide the feedback as an audio feedback output.

4. The head-mounted display of claim 1, wherein a haptic device is configured to provide the feedback as a haptic feedback output.

5. The head-mounted display of claim 1, wherein the feedback provides instructions to the user to move the head-mounted display relative to the face of the user.

6. The head-mounted display of claim 1, wherein the feedback provides a negative indication to the user based on the position of the facial interface relative to the face of the user.

7. A head-mounted display, comprising:
a display unit for displaying graphical content to a user;
a facial interface interchangeably coupled with the display unit, the facial interface configured to engage a facial engagement region of a face of the user above and below eyes of the user;
a first sensor coupled to the facial interface and configured to generate a first signal indicative of a first physiological condition in the facial engagement region, wherein the first sensor includes one or more of a force sensor or a displacement sensor configured to determine a facial characteristic of the user, and wherein the first physiological condition corresponds to an expression of the user;
a second sensor coupled to the facial interface and configured to generate a second signal indicative of a second physiological condition outside of the facial engagement region; and
a controller configured to:
assess, based on the first signal and the second signal, a position of the facial interface relative to the face of the user, and
based on the assessment, provide feedback to the user regarding the position of the facial interface relative to the face of the user.

8. The head-mounted display of claim 7, wherein the second physiological condition corresponds to a location of an eye of the user.

9. The head-mounted display of claim 8, wherein the controller is configured to:
evaluate, based on the expression and a shape of the face of the user, contact between the face of the user and the facial interface, and evaluate, based on the location of the eye of the user, positioning of the facial interface relative to the face of the user.

10. The head-mounted display of claim 7, wherein the controller is configured to compare the first physiological condition to a corresponding physiological condition sensed at a previous time, wherein the facial interface was properly positioned relative to the face of the user at the previous time.

11. The head-mounted display of claim 7, wherein the first sensor includes one or more of a capacitive sensor or a bioelectric signal sensor, and wherein the second sensor includes a camera.

12. The head-mounted display of claim 7, wherein the controller is configured to control one or more of an audio output device or a haptic device to provide the feedback to the user.

13. The head-mounted display of claim 7, wherein the controller is configured to control the display unit to provide the feedback to the user as a graphical feedback output.

14. A head-mounted display, comprising:

a display unit for displaying graphical content to a user;

a facial interface removably coupleable to the display unit, the facial interface configured to engage a facial engagement region of a face of the user above and below eyes of the user;

at least one of a force sensor or a displacement sensor embedded in the facial interface and configured to generate a signal indicative of contact between the facial engagement region and the facial interface; and a controller configured to:

evaluate, based on the signal, at least one of a shape of the facial engagement region or facial shape characteristics of the user based on the contact between the facial engagement region and the facial interface, based on the evaluation, assess a position of the facial interface relative to positions of individual features of the face of the user, and based on the assessment, provide feedback to the user regarding the position of the facial interface relative to the face of the user.

15. The head-mounted display of claim 14, wherein the signal corresponds to a distribution of forces about the facial engagement region.

16. The head-mounted display of claim 14, wherein the at least one sensor is configured to directly engage the face of the user.

17. The head-mounted display of claim 14, wherein the facial interface includes a covering and the at least one sensor is configured to indirectly engage the facial engagement region via the covering.

18. The head-mounted display of claim 14, wherein the at least one sensor is configured to be in fluidic communication with the facial engagement region and the signal corresponds to a level of moisture present in the facial engagement region.

19. The head-mounted display of claim 14, wherein the signal corresponds to a temperature of the facial engagement region.

20. The head-mounted display of claim 14, wherein the signal corresponds to a displacement of the facial interface relative to the facial engagement region.

21. The head-mounted display of claim 14, wherein the signal corresponds to muscle activity of the user within the facial engagement region.

22. The head-mounted display of claim 14, wherein the controller is configured to compare a shape of the facial engagement region to a corresponding shape of the facial engagement region sensed at a previous time, wherein the facial interface was properly positioned relative to the face of the user at the previous time.

* * * * *